(12) United States Patent
    Prince

(10) Patent No.: US 8,444,206 B2
(45) Date of Patent: May 21, 2013

(54) TENSIONING BOW MEMBER FOR A FLEXIBLE COVER SYSTEM

(75) Inventor: Donald Prince, Franklin, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 13/343,305

(22) Filed: Jan. 4, 2012

(65) Prior Publication Data

US 2012/0104788 A1    May 3, 2012

Related U.S. Application Data

(63) Continuation-in-part of application No. 13/099,870, filed on May 3, 2011, now Pat. No. 8,267,461.

(60) Provisional application No. 61/330,425, filed on May 3, 2010.

(51) Int. Cl.
    *B60P 7/04* (2006.01)

(52) U.S. Cl.
    USPC .................... 296/98; 296/100.15; 296/100.16

(58) Field of Classification Search .................... 296/98, 296/100.15, 100.16
    See application file for complete search history.

(56) References Cited

U.S. PATENT DOCUMENTS

| 1,748,031 | A | * | 2/1930 | Wiener et al. .................. 296/98 |
| 5,031,955 | A | | 7/1991 | Searfoss |
| 6,338,521 | B1 | | 1/2002 | Henning |

* cited by examiner

*Primary Examiner* — Dennis Pedder
(74) *Attorney, Agent, or Firm* — Maginot, Moore & Beck LLP

(57) ABSTRACT

A cover system for covering an open top of an open-topped container with a flexible cover includes a bail member having a first end pivotally connected to the container and an opposite second end connected to an end of the flexible cover, a hold-down bow member including an end portion pivotally connected to the bail member and an opposite end configured for bearing against the flexible cover, and a spring pack between the bail member and tensioning bow member.

14 Claims, 8 Drawing Sheets

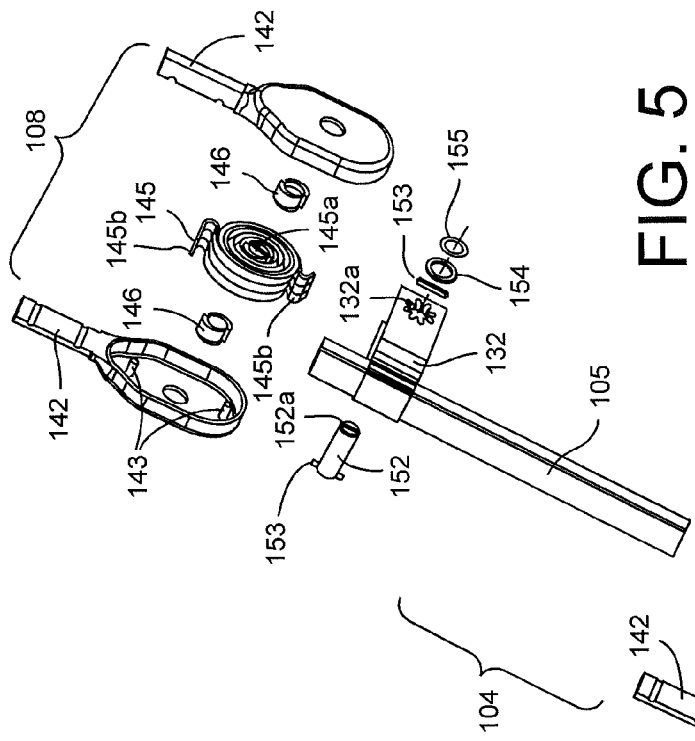
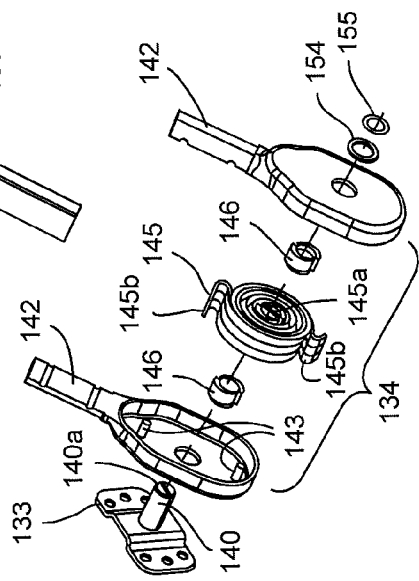
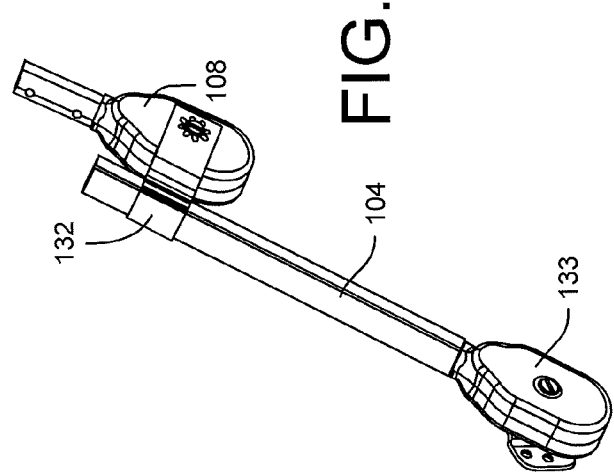

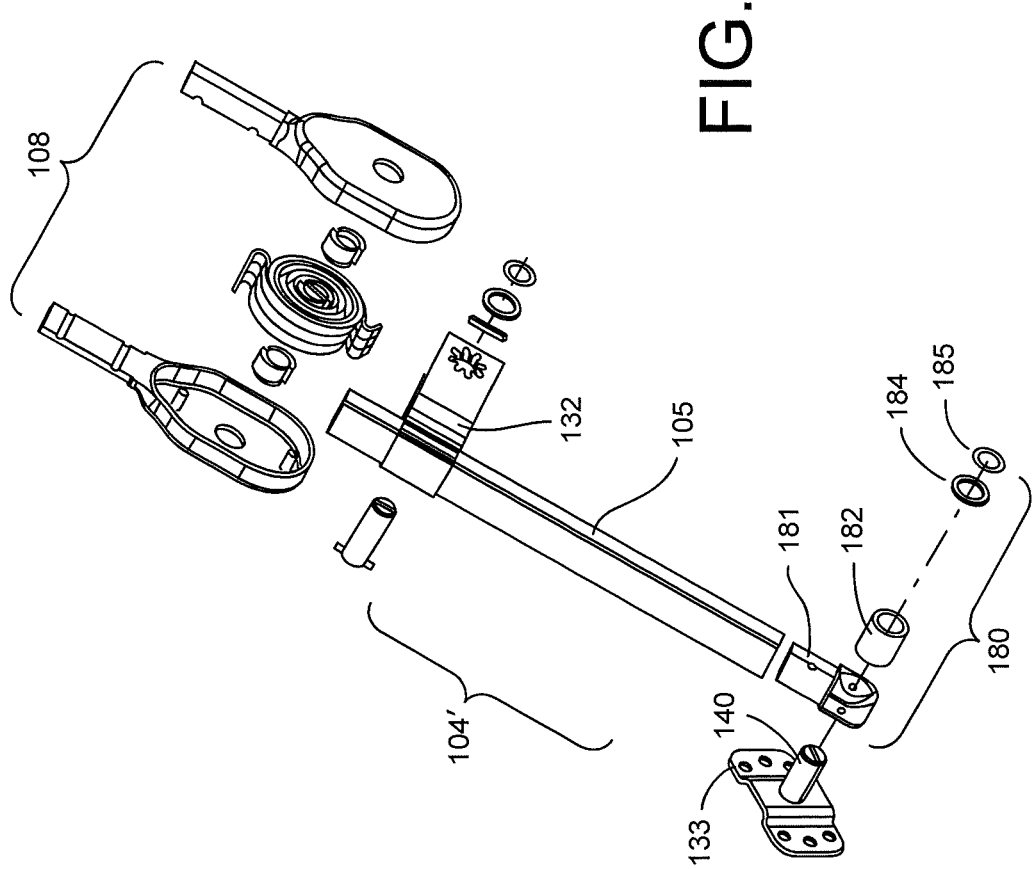

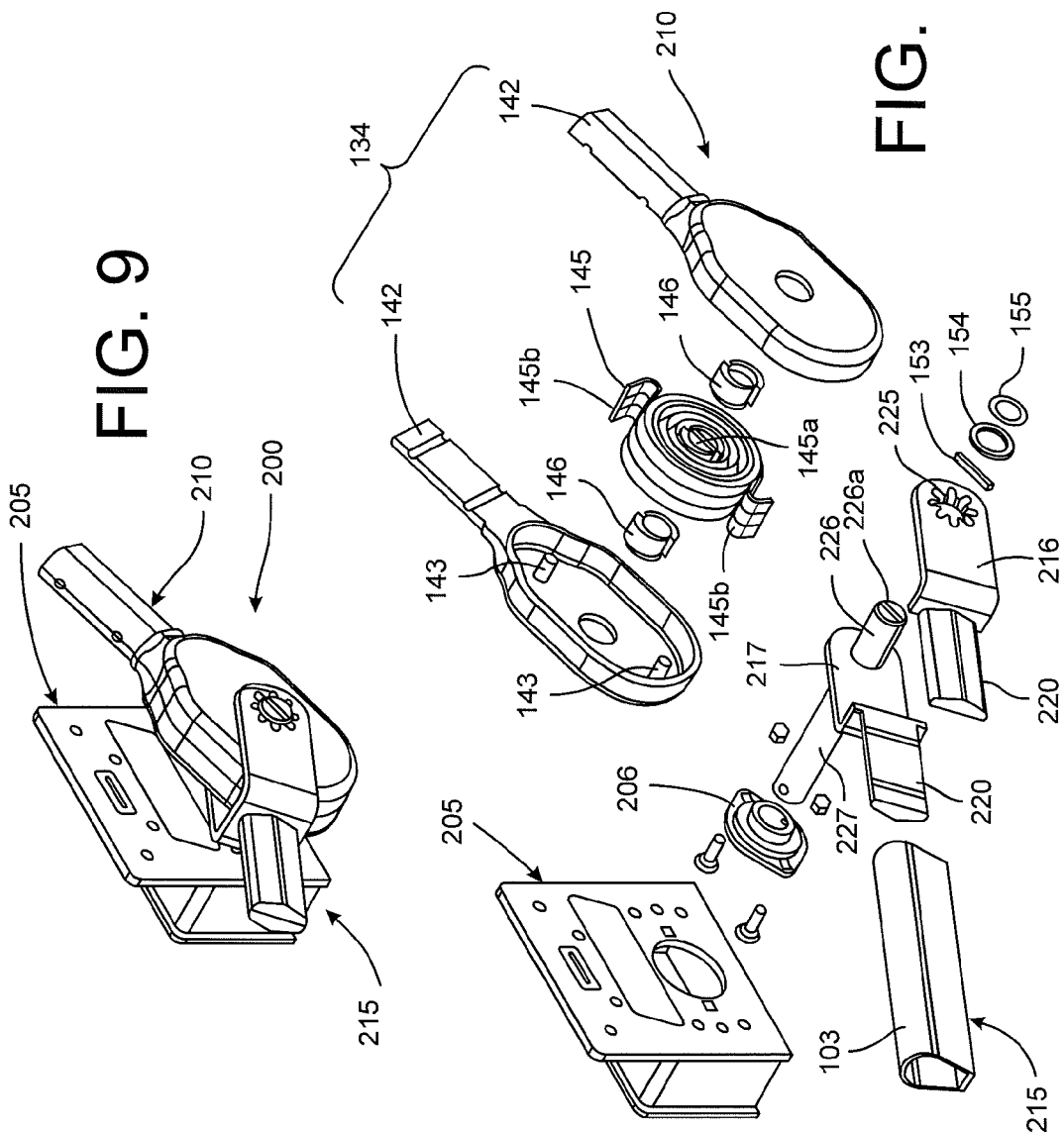

TENSIONING BOW MEMBER FOR A FLEXIBLE COVER SYSTEM

This application is a continuation-in-part of co-pending application Ser. No. 13/099,870 entitled "Tensioning Bow Member Locking Device for a Flexible Cover System", filed on May 3, 2011, which claims priority to provisional patent application Ser. No. 61/330,425, filed May 3, 2010, entitled "Tensioning Bow Member Locking Device For A Flexible Cover System," the disclosure of which is incorporated by reference herein in its entirety.

BACKGROUND

The present disclosure relates to flexible covers or tarping systems for open-topped containers and particularly concerns a mechanism for restraining the flexible cover or tarp against the container.

Many hauling vehicles, such as dump trucks, include open-topped containers used for hauling or storing various materials. In a typical dump truck application, the open-topped container is referred to as the "dump body" of the truck. The dump body is used to haul a variety of load material, such as gravel and the like, as well as organic materials, such as grain or produce. Upon reaching the dumping site, the dump truck tilts the dump body to evacuate the load material from the dump body.

Depending upon the nature of the load material stored in the open-topped container, it is often desirable to provide a cover for the container. A cover is particularly valuable for covering the dump body of a dump truck when dump truck is in transit. Rigid covers are well known that may be hinged from one end of the container body and pivoted from an open to a closed position. While rigid covers may be acceptable for stationary containers, the same is usually not true for containers associated with land-traversing vehicles. Accordingly, rigid covers have given way to flexible cover systems.

Flexible cover systems utilize a flexible tarpaulin that can be drawn from a stowed position at one end of the container, to a deployed position covering the open top of the container. The flexible tarpaulin is preferable for dump trucks, because it can be easily stowed when the cover is not needed, such as during times when the dump body is being loaded and emptied. In addition, flexible cover systems are generally easier to deploy than rigid covers.

A variety of flexible cover systems have been developed that are geared toward particular hauling vehicle applications. One such tarping system is the Easy Cover® Tarping System manufactured and sold by Aero Industries, Inc. An example of one form of the Easy Cover® Tarping System is shown in FIG. 1. The system includes a U-shaped bail member 22 that is connected at a pivot mount 25 to the base of the container body 13 on the vehicle 10. A horizontal bar 27 of the bail member 22 is attached to the tarp 16. The system also includes a U-shaped tensioning bow member 30 that is connected at a pivot mount 32 to the bail member 22. The tarp 16 is positioned between a horizontal bar 34 of the tensioning bow member 30 and the container body 13. The tarp 16 can be preferably stowed by winding onto a tarp roller assembly 19 at the forward end of the vehicle, which causes the tarp to slide under the horizontal bar 34 of the tensioning bow member 30 as the bail member 22 pivots toward the front of the container body 13.

The system includes a variety of configurations that permit manual or powered deployment of the tarp over the open top of the container. In one typical installation, the pivot mount 25 includes a torsion spring pack that is biased to rotate the bail member 22 in a clockwise direction, as shown in FIG. 1, to pull the tarp 16 over the top of the container 13. The tarp roller assembly 19 is biased to resist this rotation of the bail member 22. In some versions, a manual crank rotates the tarp roller assembly 19 to allow the tarp 16 to unfurl under the torsion force of the spring pack. In other versions, a motor controls the rotation of the tarp roller assembly. The manual crank or motor are rotated in the opposite direction to pull the bail member 22 toward the front of the container body 13 and to thereby stow the tarp 16.

One problem that is faced with tarping systems of the type shown in FIG. 1 is the effect of airflow or wind on the tarping system as the vehicle is traveling. In particular, the tarpaulin 16 is affected in a number of ways by the airflow associated with the traveling vehicle. This problem becomes especially acute at high speeds. In particular, the front end of the vehicle creates turbulent airflow that travels along the length of the container body 13. The turbulence, which can be manifested by air vortices along the top of the container body 13, has a tendency to lift the flexible cover 16 away from the top of the body.

Another problem facing the above-described tarping system is road vibration and shock, which can cause the bail member 22 and the tensioning bow member 30 to bounce on the container body 13 when the tarp 16 is deployed. This problem is especially noticeable for systems including the tensioning bow member 30, the position of which is maintained by only the weight of the tensioning bow member 30.

Movement of the tarp 16, the bail member 22, and the tensioning bow member 30 due to wind and vibration may have a deleterious effect is on the flexible cover system. The constant flapping and bouncing can gradually wear the tarp and the cover system components, which decreases the longevity of the cover system. In addition, when the tarp 16 is dislodged from its deployed position, the contents of the container body 13 are at risk of expulsion.

In order to address this problem, various systems have been devised to bias the tarp against the container body. In one common cover system, a web of cords is deployed over the tarp 16 along the length of the container body 13. The ends of the cords can be attached to mounts affixed to the side of the body 13. Whereas other cover systems rely on a complicated array of mechanical, electrical, and/or hydraulic structures to apply a constant tension along the length of the tarp 16. In most cases, however, these cover systems do not adequately restrain the bail/bow members 22, 30 or the tarp 16.

The prior approaches to maintaining the tarp against the container body either require manual intervention or sophisticated powered components. Accordingly, there remains a need for a tarping system having a tensioning bow member 30, which is less prone to the wind and vibrations associated with a moving container.

SUMMARY

In one aspect, a cover extension/retraction system is provided for covering an open top of an open-topped container with a flexible cover, the flexible cover having one end connected to one end of the container, and the cover sized to substantially cover the open top when an opposite end of the cover is moved to an extended position at the opposite end of the container. Te cover system comprises a bail member having a first end pivotally connected to the container and an opposite second end connected to the opposite end of the flexible cover in which the bail member is configured for pivoting from a stowed position to a deployed position in which the flexible cover is in the extended position. The system further comprises a hold-down bow member including one end pivotally connected to the bail member and an opposite end configured for bearing against the flexible cover between the ends of the cover.

In one feature, a torque element is connected between the bow member and the one end of the bail member. The torque element is configured to generate a torque for pivoting the bail member away from the bow member. Thus, when the bail member is in its deployed position to extend the cover, the bow member bears against the forward end of the cover to hold the cover down.

BRIEF DESCRIPTION OF THE FIGURES

FIG. 4 is an enlarged perspective view of a portion of the bail member and hold down bow member of the system shown in FIGS. 2-3.

FIG. 5 is an exploded view of the bail member and hold down bow member shown in FIG. 4.

FIG. 8 is an exploded view of a cover or tarp extension/retraction system according to another embodiment.

FIG. 9 is a perspective view of a cover or tarp extension/retraction system according to yet another embodiment.

FIG. 10 is an exploded view of the system shown in FIG. 9.

DETAILED DESCRIPTION

Figure 1:
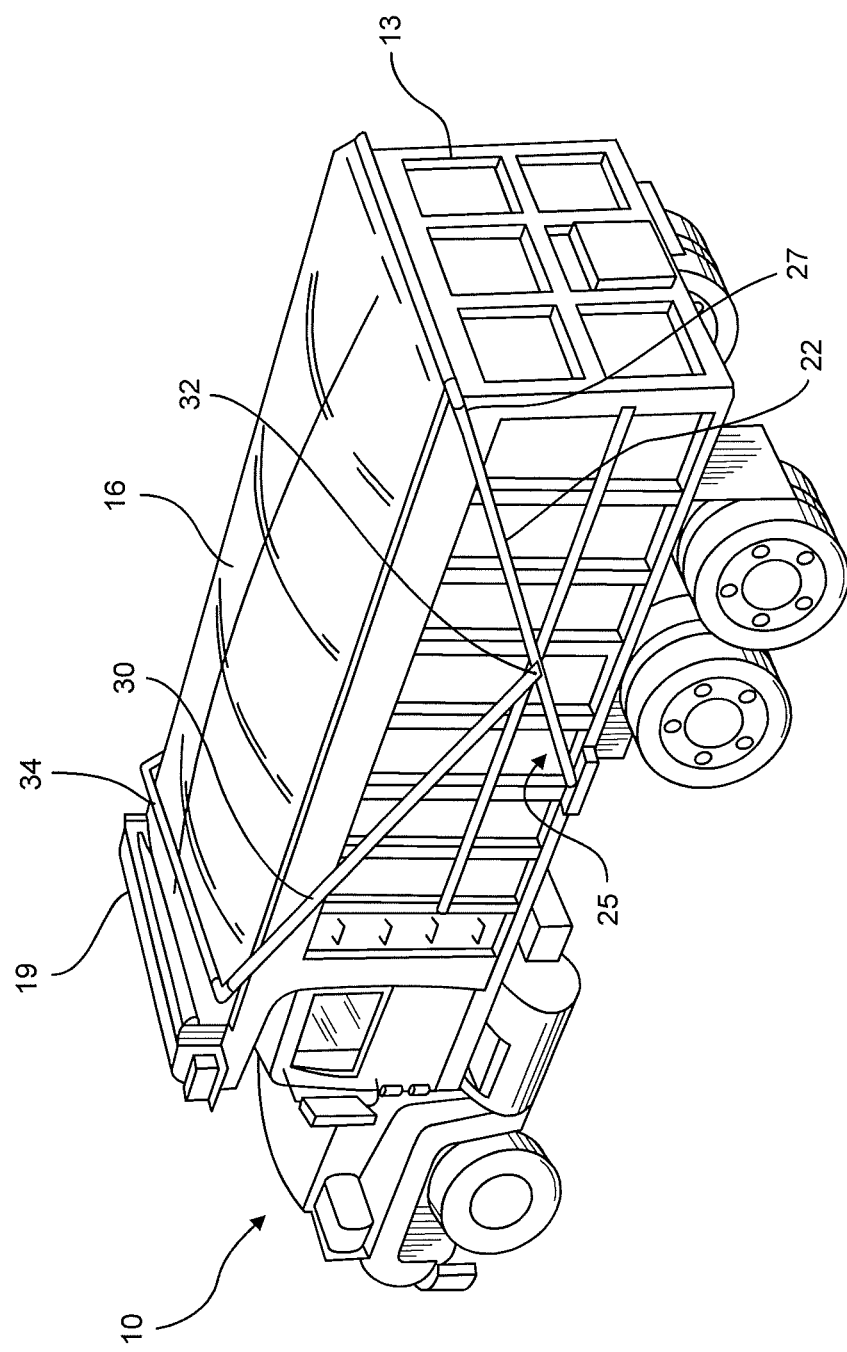
FIG. 1 is a top perspective view of a hauling vehicle utilizing a flexible cover system.

For the purpose of promoting an understanding of the principles of the disclosure, reference will now be made to the embodiments illustrated in the drawings and specific language will be used to describe the same. It should nevertheless be understood that no limitation of the scope of the disclosure is thereby intended. The disclosure includes any alterations and further modifications in the illustrated devices and described methods and further applications of the principles of the disclosure that would normally occur to one skilled in the art to which the disclosure relates. In the drawings, like reference numerals have been used throughout to designate like elements.

Figure 2:
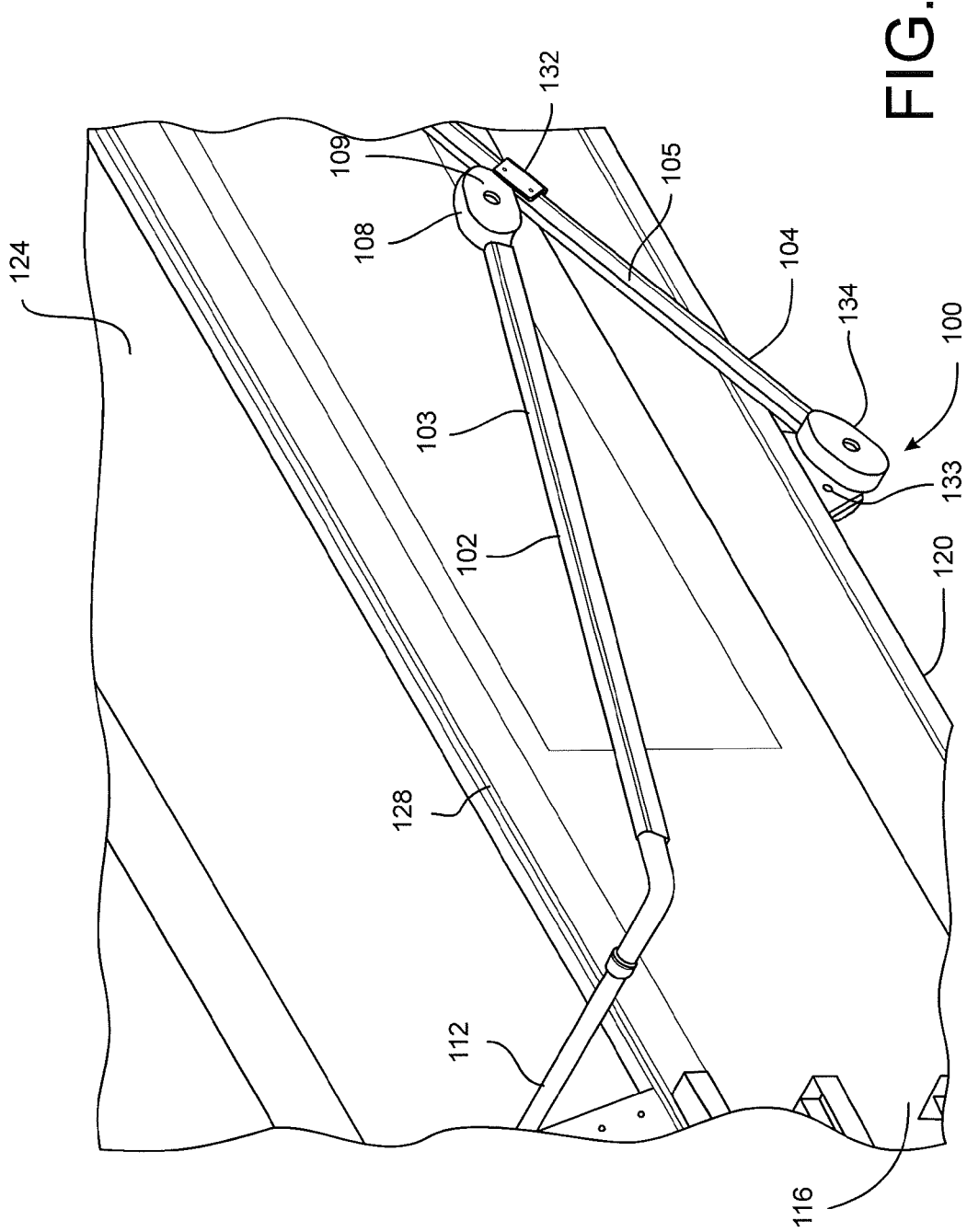
FIG. 2 is a perspective view of a hold-down portion of a cover or tarp extension/retraction system for use with the hauling vehicle of FIG. 1, according to one embodiment of the present disclosure.

As shown in FIGS. 2-3, in accordance with one embodiment of the present disclosure, a cover system, shown as a cover or tarp extension/retraction system 100 for an open-topped container 120, includes a bail member, shown as a U-shaped hold-down bow member 102, and another U-shaped tensioning bail member 104. The bail member 104 includes two legs 105 and a horizontal bar 106. End portions of the legs 105 are connected to a pivot mount 133 at the bottom of the container 120 by a pair of torque elements 134 (only one of which is illustrated in FIG. 2).

The hold-down bow member 102 includes a pair of legs 103 and a horizontal bar 112. End portion of the legs 103 is connected to the legs 105 of the bail member 104 by another pair of torque elements 108 (only one of which is illustrated in the figures). Both the bow member 102 and the bail member 104 may be formed from aluminum or another suitable lightweight and rigid material.

A rear portion of a flexible cover, shown as a tarp 124, is connected to the horizontal bar 106 of the bail member 104. A front portion of the tarp 124 is connected to and unfurled from a roller assembly 113 positioned near a front side 116 of the container 120. The horizontal bar 112 of the hold-down bow member 102 is separate from and positioned above the tarp 124 so that the mid-section 112 may bear down against the tarp in use.

The torque elements 108 include a bracket member (referred to as a connecting bracket 132), a housing 109, and a biasing spring. The connecting bracket 132 connects the torque element 108 to the leg 105 of the bail member 104. The other torque element 108 is connected to the opposite leg of the bail member 104 by another connecting bracket (not shown). The housing 109 is connected to the leg 103 of the bail member 102 and is also pivotally connected to the connecting bracket 132. The biasing spring is at least partially positioned within the housing 109.

The torque elements 108 are part of a hold-down assembly that is configured to bias the horizontal bar 112 of the tensioning bow member 102 against the tarp 124 and the side rails 128 of the container 120 (or a load carried by the container, if the load is positioned above the side rails 128) to restrain movement the tensioning bow member 102. Accordingly, the horizontal bar 112 is positioned against the tarp 124 by a force greater than just the weight of the bail member 102. The torque elements 108 exert a biasing force that is greater than the force exerted upon the tensioning bow member 102 by normal wind and/or gravity, among other effects. The torque elements 108 cause the tensioning bow member 102 to resist being pivoted toward a rear end of the container 120. The extension/retraction system 100 having the torque elements 108 may be positioned in a deployed position and positioned in a retracted or stowed position without requiring user manipulation of the torque elements.

Figure 3C:
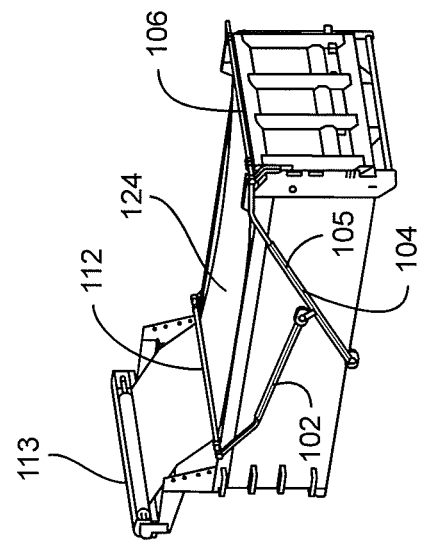
FIGS. 3a-c are views of the cover extension/retraction system shown in FIG. 2, depicted in various stages of operation.
Figure 3B:
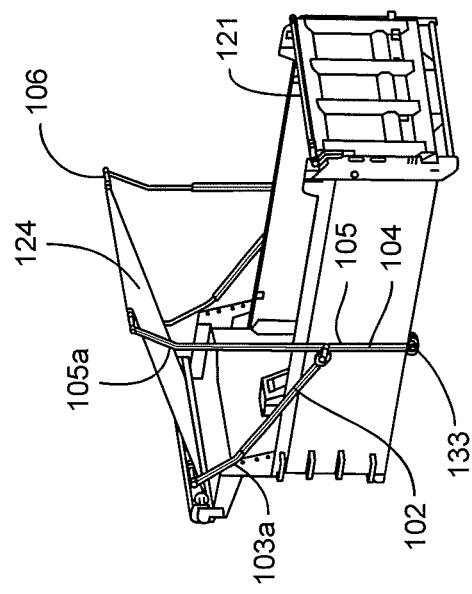
Figure 3A:
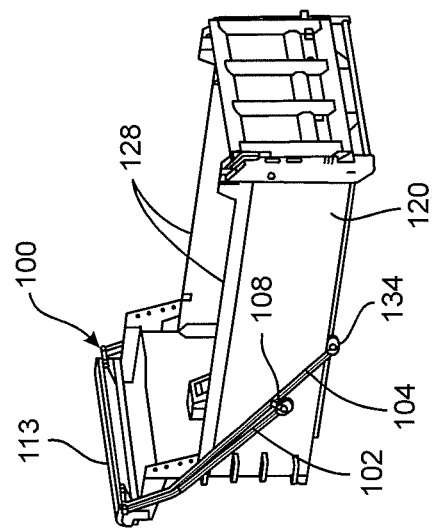

The movement of the system 100 is depicted in FIGS. 3a-3c. The cover 124 is initially stowed in the roller assembly 113 in a conventional manner. The two bow/bail members 102, 104 are aligned next to each other with the horizontal bars 112, 106 of each abutting the roller assembly. In the illustrated embodiment the legs 105 of the bail member 104 may include a bend 105a (see FIG. 3b) to accommodate the length of the container bed, as is known in the art. The legs 103 of the bow member 102 include a complementary bend 103a so the two arms can nest close together in the stowed position shown in FIG. 3a. The tarp 124 is deployed or unfurled from the roller assembly 113 as the bail member 104 rotates about the pivot mount 133 which may be under the torsional force exerted by the torque elements 134. The horizontal bar 112 of the hold-down bow member 102 remains generally adjacent the roller assembly as the bail member 104 pivots toward the rear end 121 of the container. The bow member 102 and bail member 104 thus maintain the tarp 124 in tension as it is being deployed.

As the bail member 104 approaches the rear of the container the sweep of the bail arms 105 pull the bow member 102 toward the rear as well. The torque elements 108 are arranged to exert a torsional force on the bow member 102 in the opposite direction to the torsional force generated by the bail member torque elements 134. For instance, as shown in FIGS. 3a-c, the torque elements 134 provide a torsional force to rotate the bail member 104 in the clockwise direction. Thus, the bow member 102 torque elements 109 apply a torsional force to rotate the bow member in the counter-clockwise direction. This counter-clockwise torsional force tends to push the horizontal bar 112 down against the tarp 124 is the tarp is extended. In the fully deployed position of FIG. 3c, the hold-down bow member 102, and particularly the horizontal bar 112, is pressed against the side rails 128 of the container to hold the tarp down even while the vehicle is traveling.

Details of the torque elements 108, 134 are shown in FIGS. 4-5. In one embodiment, the two torque elements 108, 134 can have the same construction, as reflected in FIG. 5. For instance, the torque element 134 includes a pair of housing 142 that are configured to house a spring pack 145. A pair of bushings 146 are provided to support the spring pack 145 on an axle extending through the housing. For the element 134 the axle is a post 140 projecting from the pivot mount 133 that is fastened to the container 120 in a conventional manner. For the element 108, the axle is the post 152 that extends through the mounting bracket 132, as described below. Both axles include a washer 154 and locking ring 155 to fix to the housings 142. Unlike the post 140 that is anchored to the container, the post 152 is freely mounted within the bracket 132. In order to restrain the post 152 from rotation (which is necessary to react the torque load of the spring pack 145) the post includes anchor pins 153 at opposite ends of the post. The pins are configured to be engaged within the star-shaped openings 132a in the bracket 132. Each post 140, 152 includes a corresponding slot 140a, 152a to engage the central segments 145a of the spring packs 145 to react the spring pack torque. The curved free ends 145b of the spring packs engage reaction posts 143 within the housings 142 to apply torque to the housings.

The housings of the torque element 134 are connected to the bail member 104 in a conventional manner so that torque generated by the spring pack 145 is transmitted to the bail member. Similarly, the housings 142 of the torque element 108 are connected to the hold-down bow member 102 so that torque generated by the spring pack is transmitted to the bow member.

The bracket 132 may be a U-shaped member configured to clamp around the bail member 104, and may thus have an interior shape that corresponds to the outer shape of the bail member. The bracket may be attached to the bail member by welding, or by a separate fastener arrangement. The fastener arrangement may be configured to permit adjustment of the location of the bracket on the bail member—i.e., closer to or farther away from the pivot mount 133. The position of the bracket 132 can thus be adjusted based on the length of the bow member 102 and the distance from the bracket to the roller assembly 113 when the extension/retraction system is rolled up, as shown in FIG. 3a. In one embodiment the bow member 102 is sized to be connected to the bail member 104 between the pivot mount 133 and the mid-point of the length of the arms 105 of the bail member. This arrangement allows the bow and bail members to nest in the stowed position and allows the hold-down bow member to bear against the tarp as close to the front end (i.e., adjacent roller assembly 113) as possible.

In the system shown in FIGS. 2-5 a single hold down bow member 102 is provided. In alternative embodiments, an additional hold down bow member may be provided to provide two points at which the cover or tarp is held against the container rails. In one embodiment, shown in FIG. 6, an additional hold down bow member 170 is mounted to the bail member 104. The additional bow member 170 includes arms 172 connected by a torque element 175 and bracket 176 to the bail member 104. The additional bow member includes a horizontal bar 173 that engages the tarp 124 at a location generally in the middle of the container 120. The arms 172 are shorter than the arms of the primary bow member 102 so that as the bail member 104 rotates toward the rear of the container the horizontal bar 173 is pulled toward the middle of the container.

Figure 7:
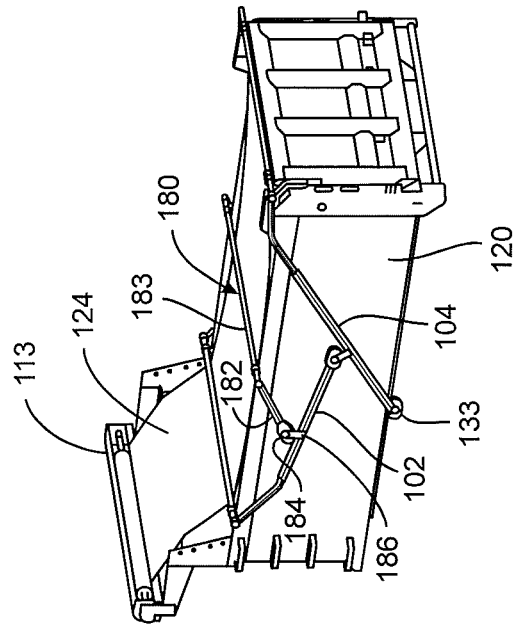
FIG. 7 is a perspective view of a cover or tarp extension/retraction system according to a further embodiment disclosed herein.

Alternatively, an additional hold down bow member 180 may be mounted to the primary bow member 102, as depicted in FIG. 7. In this embodiment the additional bow member 180 includes arms 182 mounted to the primary bow member by way of a torque element 184 and bracket 186. A horizontal bar 183 spans the width of the tarp 124 to hold the tarp down. Again, the length of the arms 182 is calibrated so that bar 183 is situated generally mid-length along the container.

Figure 6:
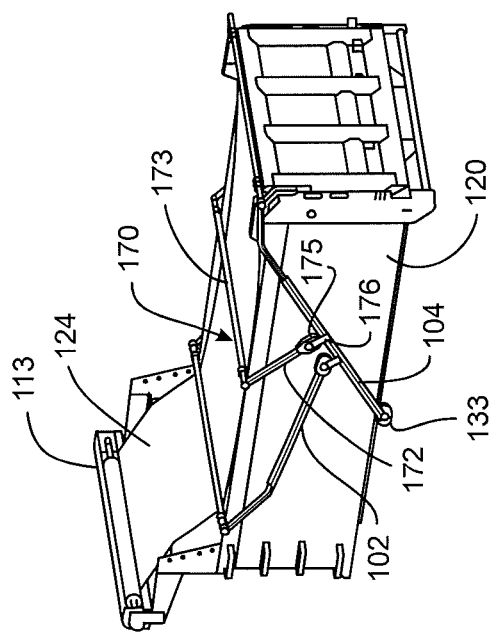
FIG. 6 is a perspective view of a cover or tarp extension/retraction system according to a further embodiment disclosed herein.

It can be appreciated that the spring packs incorporated into the torque elements 175 and 184 are configured so that the associated horizontal bars 173, 183 bear down against the tarp when the bail member 104 is fully extended, as shown in FIGS. 6-7. Thus, the torque element 175 is arranged to rotate the additional bow member 170 away from the bail member 104. Similarly, the torque element 184 is configured to rotate the additional bow member 180 away from the primary bow member 102. In both cases, as the tarp is wound onto the roller assembly 113, the tarp is wound up against the spring torque generated by the particular torque elements 175, 184.

In a modification, the bail member may be modified to eliminate the spring pack in the bail member. Thus, as illustrated in FIG. 8, the modified bail member 104' may include the same arm 105, bracket 132 and torque element 108 for connection to the bow member, as well as the same pivot mount 133 and pivot post 140. However, rather than include the torque element 134, the bail member 104' includes a collar mount 181 configured to connect to the bail arm 105. A bushing 182 fits within the collar and receives the pivot post 140. A washer 184 and locking ring 185 fix the collar mount to the pivot mount so that the bail member 104' may pivot freely about the mount 133. In this embodiment the bail member 104' cannot apply any torque to extend the cover. Instead, the torque element 108 for the bow member generates the necessary torque to deploy the bail member as the tarp is released from the roller assembly. In this embodiment the bow member reacts the torque against the tarp as the tarp is unfurled.

In another embodiment, illustrated in FIGS. 9-10, the bail member 210 and bow member 215 are pivotably mounted at a common mount 205. In this embodiment the members 210, 215 share a common torque element 134, or more particularly a common spring pack 145. The bail member 210 includes the torque element 134 including the housings 142, bushings 145 and spring pack 145, all as described above. However, rather than being mounted directly to a pivot mount (such as pivot mount 133), the torque element for bail member 210 is mounted to a pivot that is part of the hold-down bow member 215.

The bow member 215 includes two bracket components 216, 217, each including a hub 220 that is configured for attachment to the bow arm 103. One bracket component 216 includes a "star" shaped opening to receive the anti-rotation pin 153 that engages the slot of the pivot post, as described above. The pivot post 226 projects from the other bracket component 217 and includes the slot 226a that engages the center portion 145a of the spring pack 145 and is engaged by the pin 153 as just discussed. The pivot post 226 includes an inboard portion 227 that is supported by a bearing component 206 of the pivot mount 205. The pivot post portion 227 is free to rotate within the pivot mount 205. Thus, as the cover is extended and exerts pressure against the horizontal bar (112, see FIG. 3) the bow member 215 will pivot relative to the mount 205. At the same time, the spring pack 145 will exert a torque that separates the bail member 210 from the bow member 215. Since the axle about which the spring pack 145 is mounted is itself pivoting the spring pack may require a higher torque to fully extend the cover to the position shown in FIG. 3c. It is understood that the length of the bow arm 103 extends from the vehicle pivot mount location (134 in FIG. 3a) to the roller assembly 113. Thus, in the fully extended position, the horizontal bar 112 of the bow member 102 will remain adjacent the roller assembly 113 when the horizontal bar (106, see FIG. 3c) of the bow member 210 is adjacent the end 121 of the container 120. In certain cases this embodiment may be better suited to containers in which the roller assembly 113 is not elevated from the body of the container, such as is shown in FIG. 1.

Figure 11:
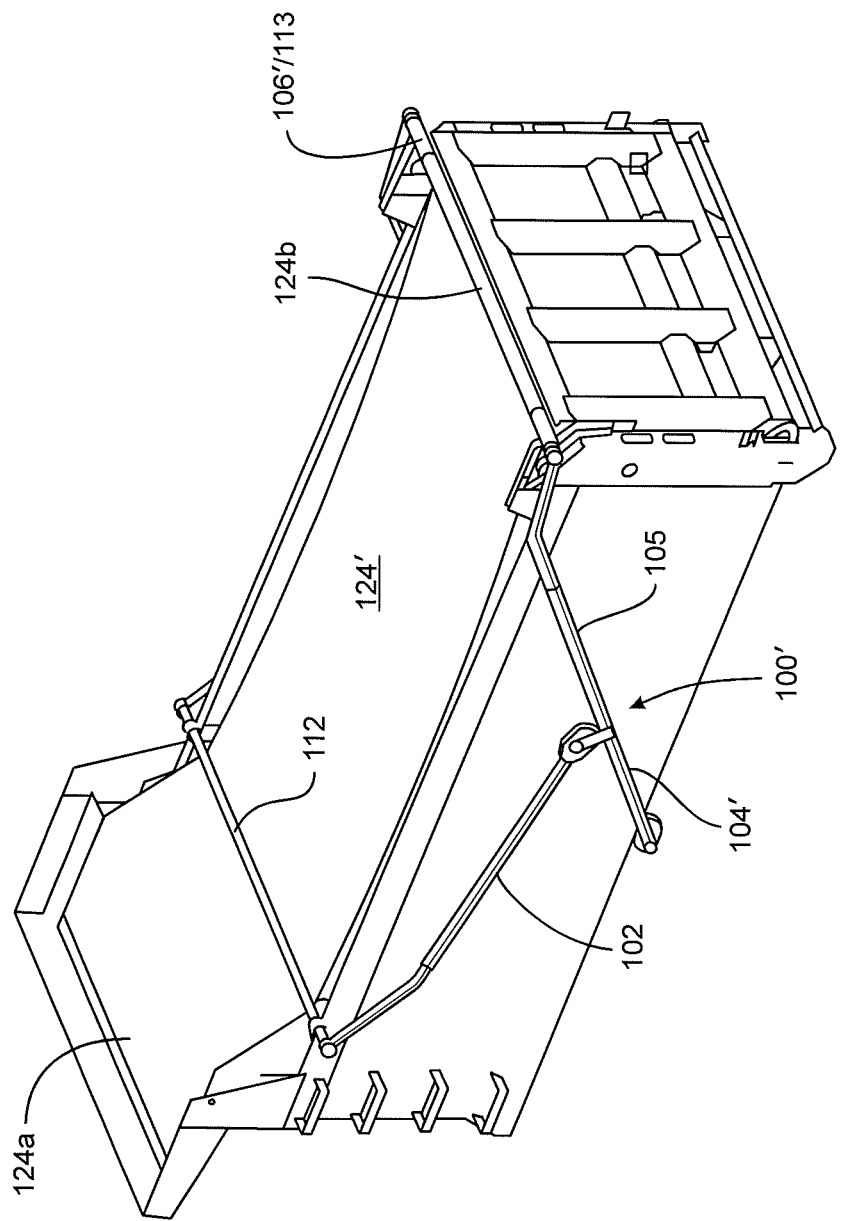
FIG. 11 is a perspective view of the cover extension/retraction system shown in FIGS. 2-3 mounted on a modified flexible cover system.

The cover extension/retraction system disclosed herein may be modified to accommodate a different flexible cover arrangement. For instance, as shown in FIG. 11, the front edge 124a of the tarp 124' may be fixed at the front of the container, while the rear edge 124b may be supported on a roller assembly 113. In this embodiment, the roller assembly 113 is part of or mounted on the horizontal bar 106' of the bail member 104'. The bail member 104, hold-down bow member 102 and horizontal bar 112 all function in the same manner as described above. The primary difference between the embodiment of FIG. 11 and that of FIG. 3 is that the tarp roller 113 moves with the bail member to unfurl or retract the tarp 124'.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A cover extension/retraction system for covering an open top of an open-topped container with a flexible cover mounted on a roller, the flexible cover having one end connected to first end of the container, and the cover sized to substantially cover the open top when an opposite end of the cover is extended from the roller to an extended position at the opposite end of the container, the cover system comprising:
a bail member having a first end pivotally connected to the container and an opposite second end connected to the opposite end of the flexible cover, said bail member configured for pivoting from a stowed position in which the cover is wound on the roller to a deployed position in which the flexible cover is in the extended position;
a hold-down bow member including one end pivotally connected to the bail member and an opposite end configured for bearing against the flexible cover between the ends of the cover; and
a torque element connected between said hold-down bow member and said one end of said bail member, said torque element configured to generate a torque for pivoting said bail member away from said hold-down bow member.

2. The system of claim 1, wherein said torque element includes a number of torsion springs connected between said bail member and said hold-down bow member and configured to bias said opposite end of said hold-down bow member away from said second end of said bail member.

3. The system of claim 1, wherein said bail member includes a pair of legs pivotably connected at said first end of said bail member to the container, and a horizontal bar extending between said pair of legs across the open top of the container and connected to the flexible cover.

4. The system of claim 1, wherein said hold-down bow member includes a pair of legs connected at said one end of said hold-down bow member to the bail member, and a horizontal bar extending between said pair of legs across the flexible cover.

5. The system of claim 1, wherein said bail member includes a torque element between said first end and the container, said torque element configured to bias said bail member to said deployed position.

6. The system of claim 1, wherein said hold-down bow member is sized so that said opposite end of said hold-down bow member bears against the flexible cover adjacent the one end of the container when said bail member is in its deployed position.

7. The system of claim 3, wherein said hold-down bow member is pivotally connected to said each leg of said bail member at a location between said first end of said bail member and a mid-length point of said legs.

8. The system of claim 7, wherein said hold-down bow member is sized so that said opposite end of said hold-down bow member bears against the flexible cover adjacent the one end of the container when said bail member is in its deployed position.

9. The system of claim 1 further comprising a secondary bow member pivotally connected to one of said bail member and said hold-down bow member, said secondary bow member including a horizontal bar configured to bear against the flexible cover at a location between said second end of said bail member and said hold-down bow member.

10. The system of claim 9, wherein said secondary bow member includes a torque element configured to generate a torque for pivoting said secondary bow member away from said one of said bail member and said hold-down bow member.

11. The system of claim 1, wherein said hold-down bow member is pivotally connected to said bail member at said first end of said bail member.

12. The system of claim 11, wherein said hold-down bow member is pivotally supported by the container and said bail member is pivotally connected to said hold-down bow member at said first end.

13. The system of claim 12, wherein said hold-down bow member includes a pivot post and said bail member is mounted on said pivot post.

14. The system of claim 13, wherein said torque element is a spring pack mounted on said pivot post of said hold-down bow member and connected to said bail member.

* * * * *